Aug. 4, 1925.

S. D. BLACK ET AL 1,548,020

REVERSING MEANS FOR ELECTRIC TOOLS

Filed March 14, 1924    3 Sheets-Sheet 1

Inventor
Samuel Duncan Black
and
Alonzo Galloway Decker.

Attorney

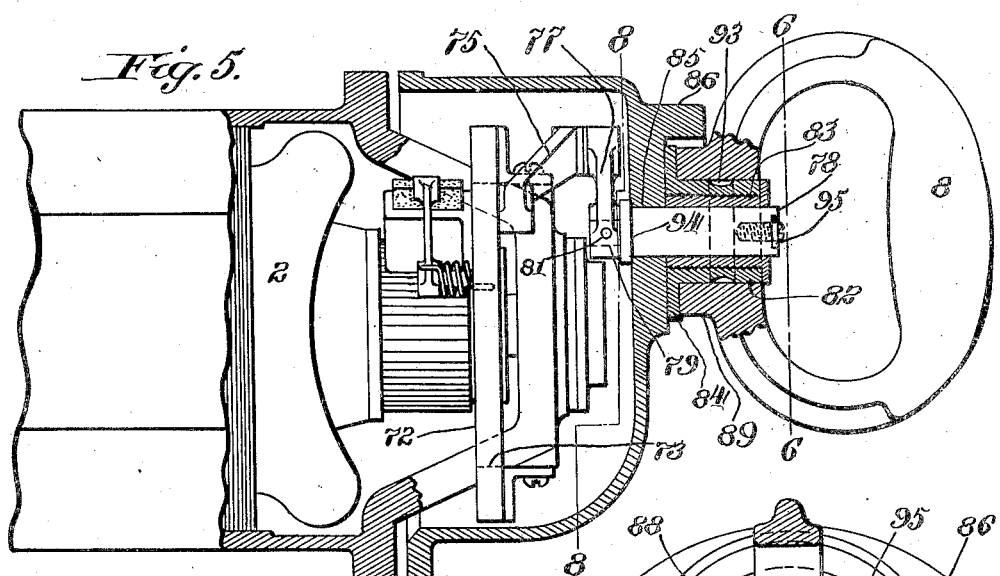
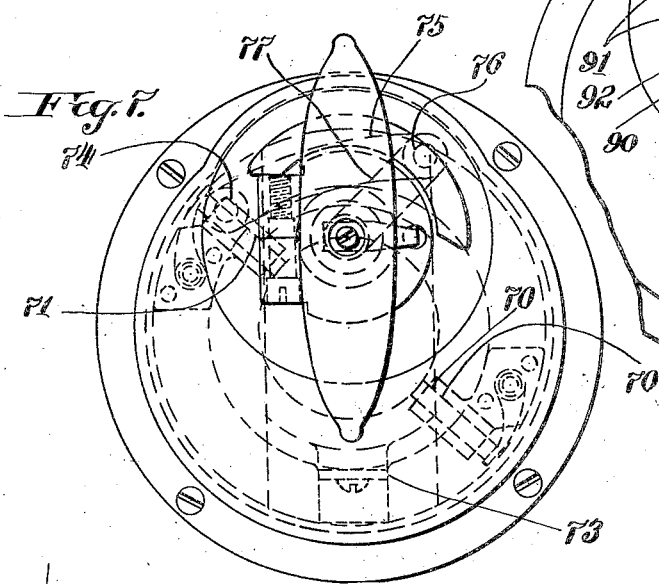

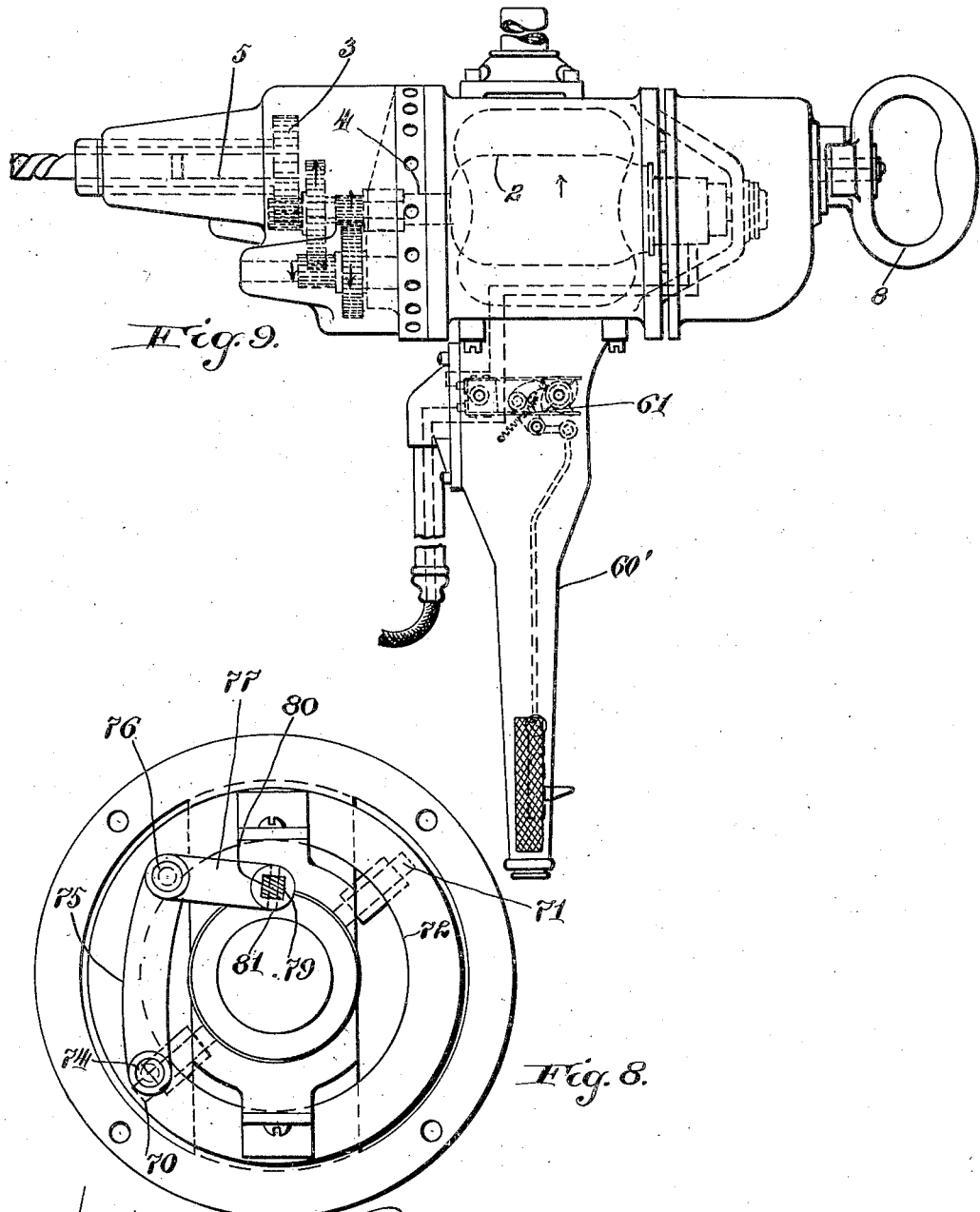

Patented Aug. 4, 1925.

1,548,020

UNITED STATES PATENT OFFICE.

SAMUEL DUNCAN BLACK AND ALONZO GALLOWAY DECKER, OF BALTIMORE COUNTY, MARYLAND.

REVERSING MEANS FOR ELECTRIC TOOLS.

Application filed March 14, 1924. Serial No. 699,172.

*To all whom it may concern:*

Be it known that SAMUEL DUNCAN BLACK and ALONZO GALLOWAY DECKER, citizens of the United States of America, both residents of the county of Baltimore, State of Maryland, have invented certain new and useful Improvements in Reversing Means for Electric Tools, of which the following is a specification.

The present invention relates to portable electric tools of the general type described in our previous Patents No. 1,245,860, November 6, 1917, No. 1,229,401, June 12, 1917, and while it is illustrated in connection with an electric drill, it may be applied to other rotary tools as screw-drivers, socket wrenches, tapping attachments, and the like.

In many operations it is desirable and necessary to reverse the direction of rotation of the bit, and the use of these power-driven portable tools has been limited to a considerable extent because they could not be easily and conveniently reversed. The fact that the direction of rotation in an electric motor may be reversed by changing the direction of the field current as related to that in the armature or by changing the position of the brushes, is well understood, but all obvious and known methods of effecting such reversal of the direction of rotation of the motor involves the necessity for freeing one hand from the control or support of the tool. These facts have an important bearing on the use of power driven electric drills in tapping, as the tap must be turned backward or reversely rotated in every instance in order to remove it from the hole after tapping or threading, and, further, the taps are of necessity made of high carbon highly tempered steel which is exceedingly brittle and easily broken, which fact adds to the difficulty incident to reversing and withdrawing the tap, as the body of the tool which in the larger sizes is quite heavy, must be guided and supported with the greatest care to prevent breaking of the tap.

The present invention is directed at the solution of the difficulty thus presented, and relates to the provision of a reversing means for a portable electric tool which is so combined with the guiding and supporting means as to be conveniently operated, reversing the direction of the rotation of the tool proper or bit without necessitating the removal of either hand from the controlling and operating handle, or handles or grips by merely turning one of the grips or handles which is preferably near the axial end of the tool.

The reversing mechanism is illustrated in the present instance in connection with a two man drill having three handles one of which is made rotatable or capable of being swung or oscillated through an arc sufficient for the purposes mentioned, i. e., to operate a reversing switch or to reverse the direction of rotation, to shift the brush mechanism of the motor and another of which is provided with a trigger switch or any suitable switch conveniently placed for starting and stopping the tool, so that the tool can be started, stopped and reversed without interfering with the manual control and support of the tool by the operator or operators.

The fact being well known as aforesaid that various motors are reversed according to the type of mechanical construction and circuit plan either by reversing the direction of main current in the field or by rotating the brush ring, we have illustrated the structure of our invention in two forms, in one of which the rotary handle which actuates the reversing mechanism is shown in connection with a switch which reverses the current through the field or the main portion of the field. The other form of the invention includes a rotary handle connected to the brush ring which is rotated through a sufficient arc to reverse the tool by corresponding rotation of the handle.

In the accompanying drawing we have illustrated an electric drill embodying our invention in the preferred form in which the tool is reversed by means of a switch connected to the handle and operated by moving the handle, and in a secondary form in which the tool is reversed by changing the position of the brush holder, the brush holder being connected to the handle for this purpose.

In the drawing—

Figure 5 is a view corresponding to Figure 1 showing the rotary handle connected to a rotary brush ring, the brush ring being moved or rotated by rotating the handle to reverse the direction of rotation of the motor and the direction of rotation of the bit.

Figure 6 is a section on the line 6, 6 of Figure 5, looking to the left in Figure 5.

Figure 7 is a view looking at the tool from the right as seen in Figure 5, showing the brush ring and brushes in dotted lines.

Figure 8 is a section on the line 8, 8 of Figure 5, the end portion or cover of the casing being removed, and the brushes being shown in the position to give opposite rotation from that which will result from the brush position shown in Figure 7.

Figure 9 is an elevation of a complete portable electric tool having the rotary reversing handle of the invention.

Figures 3, 4:
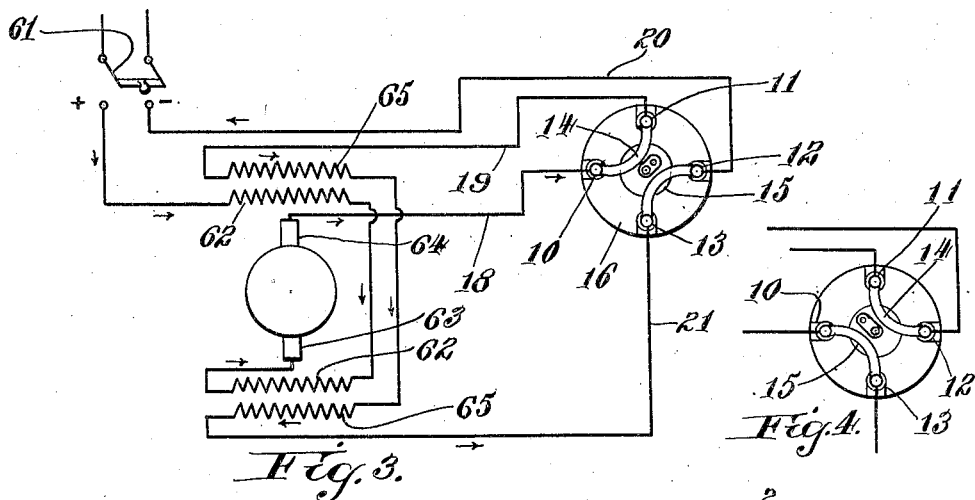
Figure 3 is a circuit diagram of the tool illustrated in Figure 1, the condition of the circuit being that existing when the motor is in counter-clockwise rotation.
Figure 4 shows the switch and immediate connections.

Referring to the drawings by numerals, the electric tool illustrated includes a casing 1, which also acts as a frame, a motor 2 mounted in the casing, and a train of reducing gears 3 connecting the shaft 4 of the motor to the spindle 5. The casing 1 is provided at the upper end with a removable cap or cover 7 on which is mounted the guiding handle 8, and in the cap concentric with the axis of the handle we have shown a switch member 9 having four contact points 10, 11, 12, 13 adapted to be in the operation of the switch, electrically connected together in pairs, i. e., in the position of the switch shown in Figure 3 points 10, and 11 are connected by conductor 14, and 12 and 13 are connected by conductor 15. In Figure 4 the switch is shown in the opposite position.

The switch 9, see Figure 3, may be of any suitable commercial variety, and is secured to the casing in any suitable manner as by means of screws 17. In the preferred form the switch has four contact points 10, 11, 12 and 13, as aforesaid, to which are connected wires 18, 19, 20, 21, respectively, forming part of the circuit illustrated in Figure 3. The switch is operated by a shaft 24, which shaft carries the conductors 14 and 15, which in the position of the switch illustrated in Figure 3 connect the contact points 10, 11 and 12, 13, respectively, in pairs, and in the position of the switch in Figure 4 connect the contact points 11, 12 and 13, 10, respectively. The details of the switch are regarded as immaterial and the showing is purely diagrammatic.

The handle 8 is mounted concentrically with the switch to rotate about a stationary hollow stud 27 having a base flange 28 secured to the casing concentrically with and surrounding an opening 29 in the casing, and by means of screws 30 or in any suitable manner. The handle 8 is in turn provided with a bearing or aperture 31 to receive and enclose the stud 27, and the handle is further provided with a boss 32 surrounding the bearing and engaging the flange 28 on the stud 27.

Figures 1, 2:
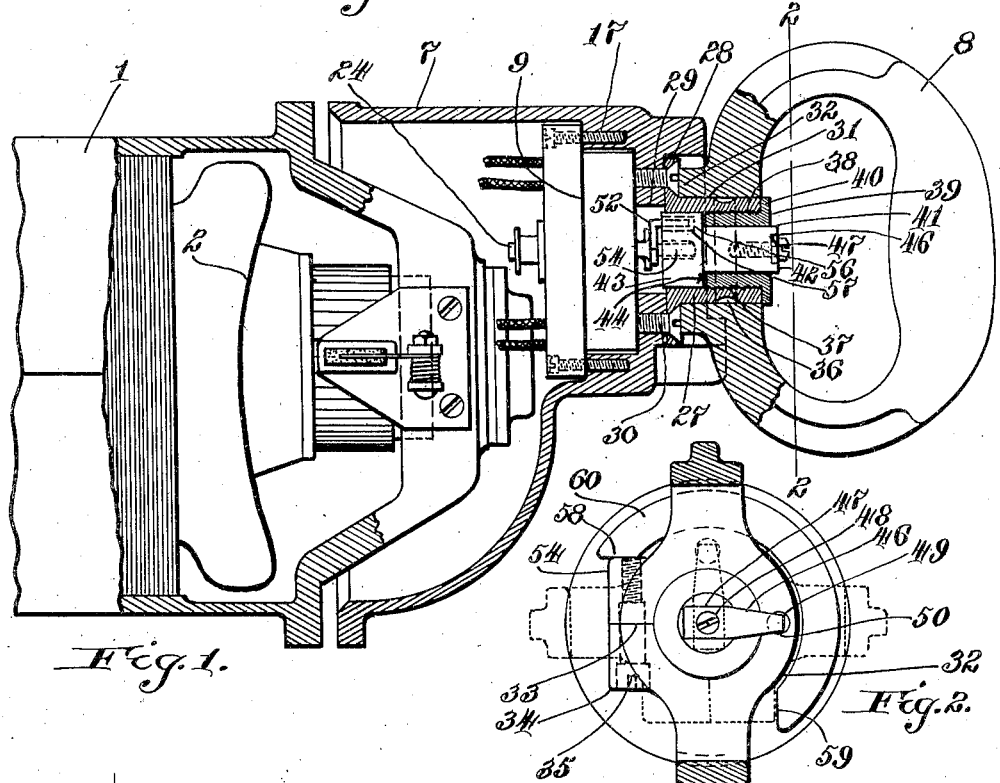
Figure 1 is a fragmentary elevation partly in central vertical section of an electric drill or similar tool embodying our invention in the preferred form.
Figure 2 is a section through the reversing or rotary handle on the line 2, 2 of Figure 1, the section being taken at right angles to Figure 1 and showing the portion of the casing etc. adjacent the handle in elevation.

The boss, as shown in plan in Figure 2, is split radially at 33 and provided with ears 34 on each side of the split which are apertured at right angles to the axis of the handle to receive a screw 35 which engages the circumferential groove 36 in the stud 27, the screw aperture 33 being so placed that it intersects the opening 31 and provides for this engagement of the screw with the groove 36. The stud 27 is in turn centrally apertured at 37, and in the form of the invention shown is threaded as to the upper or outer portion thereof adjacent the handle at 38, and a flanged bushing 39 is secured in the aperture by means of the threads, the flange 40 engaging the end of the stud and serving to position the bushing, and there is a central rotary stud 41 having a reduced shank 42 fitting and turning in said bushing, and an enlarged disc-like portion 43 meeting said shank 42 in a shoulder 44 which engages the end of the bushing 39, the contact of the shoulder with the end of the bushing serving to position the stud 41, and the stud is further held in position with the shoulder 44 against the end of the bushing 39 by means of a crank arm 46 seated in a transverse slot 47, see particularly Figure 2, in the upper end of the stud 41, and held by means of a screw 48, the crank arm being at right angles to the stud 41 and having at its end a pin 49 parallel to the stud and seated in a hole or socket 50 in the handle boss 32 on the upper surface thereof. The stud 41 is in turn connected to the shaft 24 of the switch by means of a crank 52 formed thereon, and the shaft 24, as shown, projects upward into a suitable aperture 54 in the centre of the stud disc 43, the crank or crank arm 52 being also provided at its extreme outer end with an upwardly projecting pin 56 seated in a suitable socket 57 in the disc at a point spaced outward radially from the centre.

It will thus be apparent that by rotation of the handle 8 through a suitable arc the disc or moving member 53 of the switch is moved through a corresponding and substantially equal arc sufficient to change or move the switch members or conductors 14, 15 from the relation with the contact points 10, 11, 12, 13 which they occupy in Figure 3 to that which they occupy in Figure 4, and vice versa. This arc of rotation is limited and determined by the contact of the ears 34, see Figure 2, with the abutments 58, 59 at the opposite ends of the arc of rotation thus limited, the abutments 58 being the ends of a wall or arcuate projecting portion 60 which surrounds the opening 29 in the casing and the flange 28, a portion of the wall being left out or removed to receive and provide for the swing of the ears or projecting portions 34, and to limit the arc of the swing of the handle as aforesaid.

In Figure 9 we have illustrated a starting and stopping switch 61 controlled in any suitable manner as by a pawl arm 61' by and from trigger 61". This switch may be of any suitable type.

The trigger is on grip 60'.

By reference to Figures 3 and 4 and referring first to Figure 3, the switch 61, which is illustrated diagrammatically, connects the tool circuit to the source of electricity or to the plus and minus poles of said source, and the terminals are accordingly marked plus and minus to indicate the direction of flow of the current therefrom. In accordance with the diagram and following the direction of the arrows, the current is led from the plus pole through the compensating field 62, thence to the positive brush 63 and through the armature to the negative brush 64, and to the contact point 10 of the switch from which point it is carried by conductor 14 to the contact point 11 and through the main field 65, and back to contact point 13 of the switch, and by way of conductor 15 to contact point 12, and back to the minus pole of the switch by way of conductor 20.

Considering now that the handle and switch are rotated righthanded through an arc of approximately 90°, bringing the switch members to the position shown in Figure 4, the current now flows in the same direction from the plus pole of the switch through the compensating field 62 and through the armature back to the contact member 10 of the switch, but from the contact member 10 it is led by way of the conductor 15 to the conductor 13 instead of as previously to the contact member 11 from which point it flows in a direction opposite to the arrows through the main field 65 back to the switch contact member 11, thence through the conductor 14 to the contact member 12 and back to the minus pole of the switch. The direction of the current through the main field being thus reversed, the direction of rotation of the motor, and hence of the tool bit, is reversed, and it is obvious that the direction of rotation for either position of the handle may be changed by changing the normal relation between the rotating member of the switch and the handle.

In Figures 5, 6, 7 and 8 we have illustrated a reversing device similarly actuated, i. e., by rotating the handle through a predetermined arc, but the mechanism is different in that the reversal of the direction of rotation is accomplished by changing the position of or rotating the brush ring. In this instance the motor 2 is provided with brushes 70 and 71 mounted on a suitable brush ring 72 which is in turn mounted to rotate concentrically with the armature in suitable guides 73 provided for this purpose, the brush ring being connected to the handle 8 as herein described, to rotate through an arc corresponding to the arc of rotation of the handle. To this end the brush ring 72 is provided with a wrist pin 74 seated in or connected to the brush ring and connected by a suitable connecting rod 75, which, as shown, is bowed outwardly to avoid contact with the other parts of the machine with a crank pin 76 on the outer end of an arm or crank 77, which, as shown, is connected to the end of a stud 78 concentric with the handle 8 and connected thereto to rotate therewith after a manner similar to that of the stud 41 in the previously described embodiment of the invention.

More particularly the stud 78 is formed of a square or flat-sided cross-section at the lower end at 79, and the crank 77 is formed at its inner end with a square opening 80 to fit over the square end of the stud, and is pinned thereto by a transverse pin 81, the stud 78 being offset from the centre of the brush ring and the crank 77 being shorter than the radius of the brush ring 72, i. e., the distance of the pin 74 from the centre of the brush ring. Oscillation of the stud 78 produces oscillation of the brush ring through a slightly less arc.

In the tool illustrated in Figures 5 et sequi, the handle 8 is mounted to rotate on a flanged stud 82 which is hollow, and threaded to receive a flanged bushing 83. The flange 84 of the stud is secured to the end of the casing in any suitable manner, being placed concentrically with the hole 85 in the casing which admits and contains the stud 78 and the flange 84 is partly enclosed by an upright arcuate rim 86 which presents at its ends stop surfaces 87 and 88. The handle 8 is apertured to fit the hollow flanged stud 82 and is provided with a boss 89 surrounding the opening, which boss engages at its end the flange 84 and is split at one side and provided with projecting ears 90, 91 which are apertured to receive a screw 92 at right angles to the axis of the handle, the screw hole intersecting the aperture in the handle and the screw therefore being so placed as to engage a circumferential groove 93 in the hollow stud 82, and the stud or shaft 78 is held in position by a flange 94 which engages the inside of the casing and a crank arm 95 which is fastened to the end of the shaft or stud as in the previous instance, and engages a corresponding socket 96 in the tool handle.

The rotation or oscillation of the handle is limited by the engagement of the ears 90 with the stops 87 and 88, but the arc of oscillation of the handle thus limited serves to move the brush ring and brushes through a corresponding arc sufficient to reverse the direction of rotation of the motor.

The direction of rotation of the tool can be thus reversed and it can be started and stopped without changing the grip of either hand or losing control of the tool in any way. The mere turning of the handle serves to reverse the tool and makes it possible to perform to advantage several operations as entering and withdrawing a tap which were hithertofore considered difficult or impossible with such tools. The reversing feature may also be used to advantage in operating a socket wrench or screw driver and otherwise.

We have thus described specifically and in detail a preferred and modified form of electric tool embodying our invention in order that the operation and various applications of the same may be clearly understood; however, the specific terms herein are used descriptively rather than in a limiting sense, the scope of the invention being defined in the claims.

What we claim and desire to secure by Letters Patent is:

1. In a portable electric tool, an electric motor, means for reversing the direction of rotation of the motor, a handle for guiding and supporting the tool, said handle being mounted to rotate, and means connecting said reversing means to the handle to be operated by the rotation of the handle.

2. In a portable electric tool having a frame, an electric motor, means for reversing the direction of rotation of the motor, a handle for guiding and supporting the tool, a hollow shaft secured to the tool frame and supporting the handle and about which the handle may be rotated, a second rotary member in said hollow shaft mounted to rotate relatively thereto, means for connecting said second rotary member to said handle to rotate therewith, and means for connecting said rotary member to the reversing means.

3. In a portable electric tool, a motor, means for reversing the direction of rotation of the motor, a handle for guiding and supporting the tool, a switch in connection with said handle for starting and stopping the tool, a second handle for guiding and supporting the tool, the second handle being mounted to rotate, and means connecting said handle to said reversing means for reversing the direction of rotation of the motor by rotating the handle.

4. In a portable electric tool, the combination of an electric motor, a spindle, and means rotatively connecting the motor to the spindle, means for reversing the direction of rotation of the motor, a switch for starting and stopping the motor, a handle mounted on the tool to rotate relatively thereto, means for limiting the arc of rotation of the handle, a shaft connected to the handle, and means connecting the shaft to the reversing mechanism to operate the same by rotating the handle.

5. In a portable electric tool, the combination of an electric motor, a spindle, and means rotatively connecting the motor to the spindle, means for reversing the direction of rotation of the motor, a switch for starting and stopping the motor, a handle, means rotatively supporting the handle on the tool casing consisting of a hollow shaft having a flange, means securing the flange to the casing, the handle being mounted to rotate on said hollow shaft, means extending through said hollow shaft connected at one end to the handle to rotate therewith and connected at the other end to the reversing mechanism.

6. In a portable electric tool, a motor, a spindle, means rotatively connecting the motor to the spindle, a switch for reversing the direction of rotation of the motor, a switch for starting and stopping the motor, a guiding and supporting handle having a switch actuating member for the stopping and starting switch mounted thereon, and a guiding and supporting handle mounted on the tool to rotate relatively thereto, and means for connecting the rotating handle to the reversing switch to actuate the reversing switch to reverse the direction of rotation of the motor.

7. In a portable electric tool having a casing, an electric motor, a spindle, means rotatively connecting the motor to the spindle, means for reversing the direction of rotation of the motor, a handle for guiding and supporting the tool, a switch for starting and stopping the motor, and a switch actuating member mounted on said handle and connected to said switch, a second guiding and supporting handle, means rotatively supporting the handle on the tool casing consisting of a hollow shaft, means for securing the shaft to the casing, the handle being mounted to rotate on said hollow shaft, means extending through said hollow shaft connected at one end to the handle to rotate therewith and connected at the other end to the reversing mechanism.

8. In a portable electric tool, an electric motor, means for reversing the direction of rotation of the motor, a handle for guiding and supporting the tool, means connecting said handle to the tool body providing for limited motion of the handle relatively to the tool body, and means connecting said reversing means to the handle to be operated by the motion of the handle.

Signed by us at Baltimore, Maryland, this 10 day of March, 1924.
SAMUEL DUNCAN BLACK.
ALONZO GALLOWAY DECKER.
Witnesses:
E. M. STUART,
WALTER STUMPF.